United States Patent
Lee et al.

(10) Patent No.: US 10,135,084 B2
(45) Date of Patent: Nov. 20, 2018

(54) SOLID ION CONDUCTOR, SOLID ELECTROLYTE INCLUDING THE SAME, LITHIUM BATTERY INCLUDING SOLID ELECTROLYTE, AND METHOD OF MANUFACTURING LITHIUM BATTERY

(71) Applicant: Samsung Electronics Co., Ltd., Suwon-si, Gyeonggi-do (KR)

(72) Inventors: Jae-myung Lee, Seoul (KR); Tae-young Kim, Seoul (KR); Young-sin Park, Suwon-si (KR); Seung-wook Baek, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1100 days.

(21) Appl. No.: 13/934,374

(22) Filed: Jul. 3, 2013

(65) Prior Publication Data
US 2014/0011100 A1    Jan. 9, 2014

(30) Foreign Application Priority Data
Jul. 6, 2012    (KR) .................. 10-2012-0074106
Jun. 24, 2013    (KR) .................. 10-2013-0072719

(51) Int. Cl.
*H01M 10/0562*    (2010.01)
*H01M 10/0525*    (2010.01)
(Continued)

(52) U.S. Cl.
CPC ........... *H01M 8/1016* (2013.01); *H01M 4/13* (2013.01); *H01M 4/62* (2013.01); *H01M 10/052* (2013.01);
(Continued)

(58) Field of Classification Search
CPC ............................... H01M 4/13; H01M 4/131
See application file for complete search history.

(56) References Cited

U.S. PATENT DOCUMENTS 6,994,807 B2    2/2006   Tanner
8,092,941 B2    1/2012   Weppner et al.
(Continued)

FOREIGN PATENT DOCUMENTS

DE    102007030604 A1    1/2009
DE    102011079401 A1    1/2013
(Continued)

OTHER PUBLICATIONS

Effect of Rb and Ta Doping on the Ionic Conductivity and Stability of the Garnet Li7+2x−y(La3−xRbx)(Zr2−yTay)O12 (0≤x≤0.375, 0<y<1) Lincoln J. Miara, Shyue Ping Ong, Yifei Mo, William Davidson Richards, Youngsin Park, Jae-Myung Lee, Hyo Sug Lee, and Gerbrand Ceder, Chemistry of Materials 2013 25 (15), 3048-3055.*

(Continued)

*Primary Examiner* — Stephan J Essex
(74) *Attorney, Agent, or Firm* — Cantor Colburn LLP

(57) ABSTRACT

A solid ion conductor including a garnet oxide represented by Formula 1:

$$L_{5+x}E_3(Me_z M_{2-z})O_d \qquad \text{Formula 1}$$

wherein L includes Li and is at least one of a monovalent cation and a divalent cation;
  E is a trivalent cation;
  Me and M are each independently one of a trivalent, tetravalent, pentavalent, and hexavalent cation;
  $0<x\leq 3$, $0\leq z<2$, and $0<d\leq 12$; and
  O is partially or totally substituted with at least one of a pentavalent anion, a hexavalent anion, and a heptavalent anion.

19 Claims, 5 Drawing Sheets

(51) Int. Cl.
  *H01M 8/10* (2016.01)
  *H01M 8/1016* (2016.01)
  *H01M 10/052* (2010.01)
  *H01M 4/13* (2010.01)
  *H01M 4/62* (2006.01)
  *H01M 12/06* (2006.01)
  H01M 2/16 (2006.01)
  H01M 4/36 (2006.01)

(52) U.S. Cl.
  CPC ... *H01M 10/0525* (2013.01); *H01M 10/0562* (2013.01); *H01M 12/06* (2013.01); *H01M 2/1653* (2013.01); *H01M 4/366* (2013.01); *H01M 2300/0025* (2013.01); *H01M 2300/0071* (2013.01); *H01M 2300/0088* (2013.01)

(56) References Cited

U.S. PATENT DOCUMENTS

| | | | |
|---|---|---|---|
| 2007/0148553 A1* | 6/2007 | Weppner | C01G 33/006 429/322 |
| 2010/0203383 A1 | 8/2010 | Weppner | |

FOREIGN PATENT DOCUMENTS

| | | |
|---|---|---|
| EP | 2518795 A1 | 10/2012 |
| JP | 2011-113655 A | 6/2011 |
| JP | 2011-159528 A | 8/2011 |
| WO | 2005085138 A1 | 9/2005 |
| WO | 2010090301 A1 | 8/2010 |
| WO | 2013010692 A1 | 1/2013 |
| WO | 2013085557 A1 | 6/2013 |

OTHER PUBLICATIONS

Murugan Ramaswamy et al., "Fast Lithium Ion Conduction in Grarnet-Type Li7La3Zr2O12", Angew. Chem. Int. Ed., 46, 2007, pp. 7778-7781.

Ramzy Adam et al., "Tailor-Made Development of Fast Li Ion Conducting Garnet-Like Solid Electrolytes", Applied Materials & Interfaces, vol. 2, No. 2, 2010, pp. 385-390.

Awaka et al., "Synthesis and structure analysis of tetragonal Li7La3Zr2O12 with the garnet-related type structure", Journal of Solid State chemistry, vol. 182, May 22, 2009, pp. 2046-2052.

The Extended European Search Report for European Patent Application No. 13174780.0 dated Nov. 5, 2013.

* cited by examiner

SOLID ION CONDUCTOR, SOLID ELECTROLYTE INCLUDING THE SAME, LITHIUM BATTERY INCLUDING SOLID ELECTROLYTE, AND METHOD OF MANUFACTURING LITHIUM BATTERY

CROSS-REFERENCE TO RELATED APPLICATIONS

This application claims the benefit of Korean Patent Application No. 10-2012-0074106, filed on Jul. 6, 2012, and Korean Patent Application No. 10-2013-0072719, filed on Jun. 24, 2013, and all the benefits accruing therefrom under 35 U.S.C. § 119, the content of which is incorporated herein in its entirety by reference.

BACKGROUND

1. Field

The present disclosure relates to a solid ion conductor, a solid electrolyte including the solid ion conductor, a lithium battery including the solid electrolyte, and methods of manufacturing thereof.

2. Description of the Related Art

Lithium batteries have high voltage and high energy density, and are used in various applications. Some applications have demanding specifications. In electric vehicles, for example, hybrid electric vehicles ("HEV"s) and plug-in hybrid electric vehicles ("PHEV"s), operation at high temperatures, charge and discharge of a large amount of electricity, and a long period of use are specified.

When an electrode to which a high voltage (e.g., 5 V or more) is applied is used in a lithium battery including a liquid electrolyte, which may be prepared by dissolving a lithium salt in an organic solvent, the lithium battery is chemically unstable. In addition, the liquid electrolyte starts to decompose at a voltage of 2.5 V or more. The liquid electrolyte also has a high risk of leakage, fire, and explosion. Further, the liquid electrolyte can support the growth of a dendrite, which can cause self-discharging and heating of a lithium battery.

As an example of batteries having a higher stability than that of lithium batteries including the liquid electrolyte, all-solid-state lithium batteries including a lithium ion conductor as a solid electrolyte can be considered. The lithium ion conductor constituting the solid electrolyte is a single ion conductor in which only Li ions migrate, and thus, it has less risk of ignition when compared to lithium batteries including a liquid electrolyte. Therefore, all-solid-state lithium batteries are desirable for use in electric vehicles, large-scale storage batteries, and the like.

The solid ion conductor desirably has high lithium ionic conductivity, is chemically stable, and has a wide potential window, to provide suitable properties for use as a solid electrolyte for a lithium battery.

Therefore, there is still a need to develop a solid ion conductor having an improved lithium ionic conductivity.

SUMMARY

Provided is a solid ion conductor including a novel garnet-type oxide.

Provided is a solid electrolyte including the solid ion conductor.

Provided is an all-solid-state lithium battery including the solid electrolyte.

Provided is a lithium battery including the solid ion conductor.

Provided is a lithium air battery including the solid ion conductor.

Provided are methods of preparing the solid ion conductor.

Additional aspects will be set forth in part in the description which follows and, in part, will be apparent from the description.

According to an aspect, a solid ion conductor includes a garnet oxide represented by Formula 1:

$$L_{5+x}E_3(Me_zM_{2-z})O_d \qquad \text{Formula 1}$$

wherein L is at least one of a monovalent cation and a divalent cation, and provided at least a part of or all of L is Li, E is a trivalent cation, Me and M are each independently one of a trivalent, tetravalent, pentavalent, and a hexavalent cation, $0<x\le3$, $0\le z<2$, and $0<d\le12$, and O may be partially or totally substituted with at least one of a pentavalent anion, a hexavalent anion, and a heptavalent anion.

According to another aspect, a solid electrolyte includes the solid ion conductor.

According to another aspect, an all-solid-state lithium battery includes the solid electrolyte.

According to another aspect, a lithium battery includes: a positive electrode including a positive active material; a negative electrode including a negative active material; and an organic electrolyte solution, wherein at least one of the positive electrode, the negative electrode, and the organic electrolyte solution includes the solid ion conductor.

According to another aspect, a lithium air battery includes the solid ion conductor.

According to another aspect, disclosed is a method of preparing a solid ion conductor, the method including: providing a precursor; and sintering the precursor in an air atmosphere at a temperature of about 800° C. to about 1250° C. for about 2 to about 40 hours to prepare the solid ion conductor, wherein the precursor is a precursor of a solid ion conductor which includes a garnet oxide represented by Formula 1:

$$L_{5+x}E_3(Me_zM_{2-z})O_d \qquad \text{Formula 1}$$

wherein L includes Li and is at least one of a monovalent cation and a divalent cation;

E is a trivalent cation;

Me and M are each independently one of a trivalent, tetravalent, pentavalent, and a hexavalent cation;

$0<x\le3$, $0\le z<2$, and $0<d\le12$; and

O is partially or totally substituted with at least one of a pentavalent anion, a hexavalent anion, and a heptavalent anion.

Also disclosed is method of preparing a solid ion conductor, the method including: contacting a lithium compound, a compound including a Group 1 element other than Li, a compound including a trivalent cation, and a compound including a metal element of Group 1 to Group 14 to form a mixture; and sintering the mixture to preparing the solid ion conductor, wherein the solid ion conductor has a cubic or pseudocubic structure.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
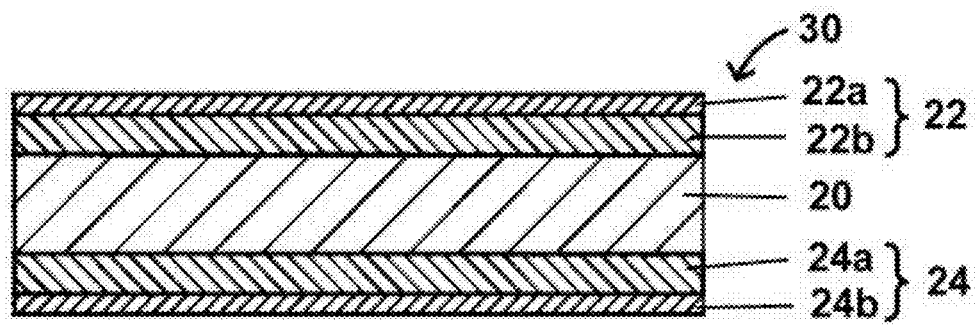
FIG. 1 is a diagram of an embodiment of an all-solid-state lithium battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Garnet" as used herein means a compound of the garnet structural group. Garnet is often used to refer to silicates, however for convenience "garnet" as used herein refers to compounds having a cubic or pseudocubic structure corresponding to the structure of compounds of the general formula $L_3E_2(MO_4)_3$, such as $Y_3Fe_2(FeO_4)_3$ or $Gd_3Ga_2(GaO_4)_3$.

Hereinafter, a solid ion conductor according to one or more exemplary embodiments, a solid electrolyte including the solid ion conductor, an all-solid-state lithium battery including the solid electrolyte, a lithium battery including an organic electrolyte solution including the solid ion conductors, a lithium air battery including the solid electrolyte, and methods of preparing the foregoing will be described in more detail.

Solid Ion Conductor

A garnet-type oxide, such as $Li_5La_3M_2O_{12}$ (M=Nb or Ta), is chemically stable and has a wide potential window, but has poor lithium ionic conductivity (e.g., approximately ~$10^{-6}$ S/cm) at 25° C. Disclosed is a solid ion conductor comprising a garnet-type oxide having improved lithium conductivity.

According to an embodiment, a solid ion conductor includes a garnet-type oxide represented by Formula 1 below:

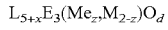

$$L_{5+x}E_3(Me_z,M_{2-z})O_d \qquad \text{Formula 1}$$

wherein L is at least one of a monovalent cation and a divalent cation, and provided at least a part of or all of L is Li; E is a trivalent cation; Me and M are each independently one of a trivalent, tetravalent, pentavalent, and a hexavalent cation; $0<x\leq3$, $0\leq z<2$, and $0<d\leq12$; and O may be partially or totally substituted with at least one of a pentavalent anion, a hexavalent anion, and a heptavalent anion.

In an embodiment, in the Formula 1, E may be partially substituted with a monovalent ion. In another embodiment, for example, in the solid ion conductor, when $0<x\leq2.5$, E may be La and M may be Zr.

In addition to the garnet-type oxide, the solid ion conductor may further include a Group 1 element having an atomic weight of at least 30 Daltons (Da). In the solid ion conductor, the Group 1 element having an atomic weight of at least 30 Da may be present at an intragrain region, e.g., within a grain, of the garnet-type oxide of Formula 1. The amount of the Group 1 element having an atomic weight of at least 30 Da may be in a range of about 0.25 to about 3.85 weight percent (wt %), specifically about 0.5 to about 3.5 wt %, more specifically about 1 to about 3 wt %, based on a total weight of the solid ion conductor. For example, the amount of the Group 1 element having an atomic weight of at least 30 Da may be in a range of about 0.5 to about 2.0 wt %, based on the total weight of the solid ion conductor.

Alternatively, in the solid ion conductor, the Group 1 element having an atomic weight of at least 30 Da may be present at a grain boundary, e.g., in an intergrain region, of the garnet-type oxide of Formula 1.

According to an embodiment, the solid ion conductor includes a garnet-type oxide represented by Formula 2 below:

$$L_{5+x+2y}(D_y,E_{3-y})(Me_z,M_{2-z})O_d \qquad \text{Formula 2}$$

wherein L is at least one of a monovalent cation and a divalent cation, and provided at least a part of or all of L is Li; D is a monovalent cation; E is a trivalent cation; Me and M are each independently one of a trivalent, tetravalent, pentavalent, and a hexavalent cation; $0<x+2y\leq3$, $0<y\leq0.5$, $0\leq z<2$, and $0<d\leq12$; and O may be partially or totally substituted with at least one of a pentavalent anion, a hexavalent anion, and a heptavalent anion.

In the garnet-type oxide of Formula 2, the trivalent cations may be present at a dodecahedral site, and at least a part of the trivalent cations present at the dodecahedral site may be substituted with a monovalent cation having a larger ionic radius than that of the trivalent cation. While not wanting to be bound by theory, it is understood that such substitution in the garnet-type oxide of Formula 2 provides an increased lattice parameter and reduced activation energy. In addition, a monovalent cation having a smaller electronegativity may be substituted for the trivalent cation, and thus a distance between oxygen ions in the vicinity of lithium ions present at the tetrahedral and/or octahedral site(s) may vary. Therefore, migration of the lithium ions may be facilitated.

In an embodiment, the garnet-type oxide of Formula 2 may be represented by Formula 3 below:

$$L_{5+x+2y}(D_y,La_{3-y})(Me_z,Zr_{2-z})O_d \qquad \text{Formula 3}$$

wherein D is a monovalent cation; Me is one of a trivalent, tetravalent, pentavalent, and a hexavalent cation; $0<x+2y\leq3$, $0<y\leq0.5$, $0\leq z<2$, and $0<d\leq12$; and O may be partially or totally substituted with at least one of a pentavalent anion, a hexavalent anion, and a heptavalent anion. For example, x and y in Formula 3 may satisfy the condition: $0<x+2y\leq1$, for example, $1<x+2y\leq2$, for example, $2<x+2y\leq2.5$.

For example, when the monovalent cation, which is substituted for the trivalent cation, has a larger ionic radius than that of the trivalent cation, the migration of the lithium ions may be facilitated. For example, in the solid ion conductor of Formulas 1, 2, or 3, D may comprise potassium (K), rubidium (Rb), or cesium (Cs). In an embodiment, D is potassium (K), rubidium (Rb), or cesium (Cs).

For example, in the solid ion conductor of Formulas 1, 2, 3, or 4, Me may be a transition metal. For example, Me may be at least one of tantalum (Ta), niobium (Nb), yttrium (Y), scandium (Sc), tungsten (W), molybdenum (Mo), antimony (Sb), bismuth (Bi), hafnium (Hf), vanadium (V), germanium (Ge), silicon (Si), aluminum (Al), gallium (Ga), titanium (Ti), cobalt (Co), indium (In), zinc (Zn), and chromium (Cr).

For example, in the solid ion conductor of Formulas 1, 2, 3, or 4, L may be at least one of lithium (Li), sodium (Na), magnesium (Mg), calcium (Ca), potassium (K), and hydrogen (H). For example, L may be Li and monovalent and/or divalent ions such as Na, Mg, and the like.

In the solid ion conductor, the garnet-type oxide of Formula 2 may be represented by Formula 5 below:

$$Li_{5+x+2y}(D_y,La_{3-y})Zr_2O_d \qquad \text{Formula 5}$$

In Formula 5, D may be K, Rb, or Cs, $0<x+2y\leq3$, $0<y\leq0.5$, $0<d\leq12$, and O may be partially or totally substituted by at least one of a pentavalent anion, a hexavalent anion, and a heptavalent anion.

For example, in the garnet-type oxide of Formula 5, x and y may satisfy the following condition: $2<x+2y\leq3$.

In the solid ion conductor, the garnet-type oxide may have an ionic conductivity of about $6.0\times10^{-4}$ Siemens per centimeter (S/cm) or more at 25° C. For example, the garnet-type oxide of the solid ion conductor may have an ionic conductivity of about $6.5\times10^{-4}$ S/cm or more at 25° C. For example, the garnet-type oxide of the solid ion conductor may have an ionic conductivity of about $7.0\times10^{-4}$ S/cm or more at 25° C. For example, the garnet-type oxide of the solid ion conductor may have an ionic conductivity of about $7.5\times10^{-4}$ S/cm or more at 25° C. For example, the garnet-type oxide of the solid ion conductor may have an ionic conductivity of about $8.0\times10^{-4}$ S/cm or more at 25° C. For example, the garnet-type oxide of the solid ion conductor may have an ionic conductivity of about $8.3\times10^{-4}$ S/cm or more at 25° C. In an embodiment, the garnet-type oxide of the solid ion conductor has an ionic conductivity of about $1.0\times10^{-4}$ S/cm to about $1.0\times10^{-3}$ S/cm, specifically about $5.0\times10^{-4}$ S/cm to about $9.0\times10^{-4}$ S/cm, more specifically about $6.0\times10^{-4}$ S/cm to about $8.0\times10^{-4}$ S/cm.

In the solid ion conductor, the garnet-type oxide may have an activation energy that is less than about 0.34 electron volts (eV) at a temperature of −10° C. to 100° C. For example, the garnet-type oxide of the solid ion conductor may have an activation energy of about 0.30 eV or less at a temperature of −10° C. to 100° C. For example, the garnet-type oxide of the solid ion conductor may have an activation energy of about 0.29 eV or less at a temperature of −10° C. to 100° C. As the activation energy decreases, the ionic conductivity of the solid ion conductor according to temperature becomes insensitive to temperature, and thus, the solid ion conductor may have improved low-temperature properties. In an embodiment, the garnet-type oxide may have an activation energy of about 0.2 to about 0.35 eV at a temperature of −10° C. to 100° C.

Solid Electrolyte

According to another embodiment, a solid electrolyte includes the solid ion conductor. Due to the inclusion of the solid ion conductor, which has a novel structure, the solid electrolyte has a high ionic conductivity, a high chemical stability, and a wide potential window, and thus, may be used as an electrolyte for a battery, such as a lithium battery and the like.

The solid electrolyte may further include a second solid ion conductor, in addition to the solid ion conductor including the garnet-type oxide of Formulas 1, 2, 3, or 4. For example, a second solid ion conductor may be a sulfide-based conductor or an oxide-based conductor. Non-limiting examples of the second solid ion conductor include $Li_3N$, a Lithium Super Ionic Conductor ("LISICON") such as $Li_{1+x}Zr_2Si_xP_{3-x}O_{12}$ where $0<x<3$, $Li_{3-y}PO_{4-x}N_x$ wherein $0<y<3$ and $0<x<4$ ("LIPON"), a thio-LISICON of the formula $Li_{4-x}M_{1-y}M'_yS_4$ (M=Si, Ge and M'=P, Al, Zn, Ga) and the like, specifically $Li_{3.25}Ge_{0.25}P_{0375}S_4$, $Li_2S$, $Li_2S$—$P_2S_5$, $Li_2S$—$SiS_2$, $Li_2S$—$GeS_2$, $Li_2S$—$B_2S_5$, $Li_2S$—$Al_2S_5$, and $Li_2O$—$Al_2O_3$—$TiO_2$—$P_2O_5$ ("LATP"). Also, any suitable solid ion conductor known in the art may be used as the second solid ion conductor. For example, the solid electrolyte may comprise a lithium lanthanum titanate ("LLTO") such as $Li_{0.34}La_{0.51}TiO_{2.94}$, or a lithium titanium aluminum phosphate ("LTAP") such as $Li_{1+x}Ti_{2-x}Al(PO_4)_3$ wherein $0\leq x\leq 0.4$ and wherein at least a part of the $Ti^{4+}$ and $P^{5+}$ may be substituted with a trivalent ion such as $Al^{3+}$, $Ga^{3+}$, $Sc^{3+}$, $In^{3+}$, $Y^{3+}$ and the like.

The solid electrolyte may be in the form of powder or a bulk solid. The bulk solid form may be, for example, a pellet, a thin film, or the like, but is not limited thereto. The solid electrolyte may have various forms according to the use purpose thereof. For example, the solid electrolyte may be in the form of ceramic, and it may be prepared by a deposition method, such as sputtering, pulsed plasma laser deposition ("PLD"); a spin coating method; and the like.

All-Solid-State Lithium Battery

According to another embodiment, an all-solid-state lithium battery includes the solid electrolyte including the solid ion conductor, which has a novel structure, described above.

Since the all-solid-state lithium battery includes a novel solid electrolyte having an improved ionic conductivity, the all-solid-state lithium battery has a reduced interfacial resistance, and thus, polarization thereof may be decreased. Therefore, the all-solid-state lithium battery may have an increased energy efficiency.

The all-solid-state lithium battery may include a positive electrode, a negative electrode, and the solid electrolyte disposed between the positive electrode and the negative electrode. Also, the all-solid-state lithium battery may further include a polymer electrolyte membrane between the positive electrode and the solid electrolyte, and/or between the negative electrode and the solid electrolyte. Due to the inclusion of the polymer electrolyte membrane, adhesion between the solid electrolyte and the positive electrode and/or the negative electrode may be improved, and thus, battery characteristics may be improved. The polymer electrolyte membrane may be impregnated with an organic electrolyte solution including a lithium salt and an organic solvent.

The all-solid-state lithium battery may be prepared as follows:

First, a solid electrolyte including the garnet-type oxide described above is prepared.

Next, a positive electrode is prepared.

The positive electrode may be prepared by forming a positive active material layer including a positive active material on a current collector. The positive active material layer may be prepared using a vapor-state method or a solid-state method. Examples of the vapor-state method include pulse laser deposition ("PLD"), sputtering deposition, and chemical vapor deposition ("CVD"). However, the vapor-state method is not limited thereto, and any suitable vaporization method known in the art may be used. Examples of the solid-state method include a sintering method, a sol-gel method, a doctor-blade method, screen printing, slurry casting, and powder compression. However, the solid-state method is not limited thereto, and any suitable solid-state method known in the art may be used.

The positive active material may be any of various suitable materials that are used in lithium batteries. For example, the positive active material may be a lithium transition metal oxide, a transition metal sulfide, or the like.

For example, the positive active material may include a composite oxide of lithium and a metal of at least one of cobalt, manganese, and nickel. For example, the positive active material may be a compound represented by any of the Formulas: $Li_aA_{1-b}B_bD_2$ wherein $0.90\leq a\leq 1.8$ and $0\leq b\leq 0.5$; $Li_aE_{1-b}B_bO_{2-c}D_c$ wherein $0.90\leq a\leq 1.8$, $0\leq b\leq 0.5$, and $0\leq c\leq 0.05$; $LiE_{2-b}B_bO_{4-c}D_c$ wherein $0\leq b\leq 0.5$ and $0\leq c\leq 0.05$; $Li_aNi_{1-b-c}Co_bB_cD_\alpha$ wherein $0.90\leq a\leq 1.8$, $0\leq b\leq 0.5$, $0\leq c\leq 0.05$, and $0<\alpha\leq 2$; $Li_aNi_{1-b-c}Co_bB_cO_{2-\alpha}F_\alpha$ wherein $0.90\leq a\leq 1.8$, $0\leq b\leq 0.5$, $0\leq c\leq 0.05$, and $0<\alpha<2$; $Li_aNi_{1-b-c}CO_bB_cO_{2-\alpha}F_2$ wherein $0.90\leq a\leq 1.8$, $0\leq b\leq 0.5$, $0\leq c\leq 0.05$, and $0<\alpha<2$; $Li_aNi_{1-b-c}Mn_bB_cD_\alpha$ wherein $0.90\leq a\leq 1.8$, $0\leq b\leq 0.5$, $0\leq c\leq 0.05$, and $0<\alpha\leq 2$; $Li_aNi_{1-b-c}Mn_bB_cO_{2-\alpha}F_\alpha$ wherein $0.90\leq a\leq 1.8$, $0\leq b\leq 0.5$, $0\leq c\leq 0.05$, and $0<\alpha<2$; $Li_aNi_{1-b-c}Mn_bB_cO_{2-\alpha}F_2$ wherein $0.90\leq a\leq 1.8$, $0\leq b\leq 0.5$, $0\leq c\leq 0.05$, and $0<\alpha<2$; $Li_aNi_bE_cG_dO_2$ wherein $0.90\leq a\leq 1.8$, $0\leq b\leq 0.9$, $0\leq c\leq 0.5$, and $0.001\leq d\leq 0.1$; $Li_aNi_bCo_cMn_dGeO_2$ wherein $0.90\leq a\leq 1.8$, $0\leq b\leq 0.9$, $0\leq c\leq 0.5$, $0\leq d\leq 0.5$, and $0.001\leq e\leq 0.1$; $Li_aNiG_bO_2$ wherein $0.90\leq a\leq 1.8$ and $0.001\leq b\leq 0.1$; $Li_aCoG_bO_2$ wherein $0.90\leq a\leq 1.8$ and $0.001\leq b\leq 0.1$; $Li_aMnG_bO_2$ where $0.90\leq a\leq 1.8$ and $0.001\leq b\leq 0.1$; $Li_aMn_2G_bO_4$ wherein $0.90\leq a\leq 1.8$ and $0.001\leq b\leq 0.1$; $QO_2$; $QS_2$; $LiQS_2$; $V_2O_5$; $LiV_2O_5$; $LiIO_2$; $LiNiVO_4$; $Li_{(3-f)}J_2(PO_4)_3 (0\leq f\leq 2)$; $Li_{(3-f)}Fe_2(PO_4)_3$ wherein $0\leq f\leq 2$; and $LiFePO_4$, in which in the foregoing positive active materials A is at least one of Ni, Co, and Mn; B is at least one of Al, Ni, Co, Mn, Cr, Fe, Mg, Sr, V, and a rare-earth element; D is at least one of O, F, S, and P; E is at least one of Co, and Mn; F is at least one of F, S, and P; G is at least one of Al, Cr, Mn, Fe, Mg, La, Ce, Sr, and V; Q is at least one of Ti, Mo, and Mn; I is at least one of Cr, V, Fe, Sc, and Y; and J is at least one of V, Cr, Mn, Co, Ni, and Cu.

Examples of the positive active material include $LiCoO_2$, $LiMn_xO_{2x}$ where x=1 or 2, $LiNi_{1-x}Mn_xO_{2x}$ where $0<x<1$, $Ni_{1-x-y}Co_xMn_yO_2$ where $0\leq x\leq 0.5$ and $0\leq y\leq 0.5$, $LiFePO_4$, $TiS_2$, $FeS_2$, $TiS_3$, and $FeS_3$.

The positive active material layer may further include the solid ion conductor described above, in addition to the positive active material. Due to the inclusion of the solid ion conductor, an interfacial resistance between the positive active material layer and a layer of the solid electrolyte that contacts the positive electrode may be reduced, ionic conductivity in the positive active material layer may be improved, and thermal stability of the positive electrode may be improved.

In addition, the positive active material layer may further include a conductive agent and a binder. Any suitable conductive agent and binder used in the art may be used.

Next, a negative electrode is prepared.

The negative electrode may be prepared using the same method used to prepare the positive electrode, except that a negative active material is used instead of the positive active material. The negative electrode may also further include the solid ion conductor described above in a negative active material layer.

A negative active material may be any suitable material that is used in lithium batteries. For example, the negative active material may be at least one of lithium metal, a metal that is alloyable with lithium, a transition metal oxide, a non-transition metal oxide, and a carbonaceous material.

Examples of the metal that is alloyable with lithium include Si; Sn; Al; Ge; Pb; Bi; Sb; an Si—Y alloy where Y is at least one of an alkali metal, an alkali earth metal, a Group 8 element, a Group 14 element, a transition metal, and a rare-earth element and is not Si; and an Sn—Y alloy where Y is at least one of an alkali metal, alkali earth metal, a Group 8 element, a Group 14 element, a transition metal, and a rare-earth element and is not Sn. The element Y may be at least one of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

Non-limiting examples of the transition metal oxide include lithium titanium oxide, vanadium oxide, and lithium vanadium oxide.

For example, the non-transition metal oxide may be $SnO_2$ or $SiO_x$ where $0<x\leq2$.

Examples of the carbonaceous material include crystalline carbon, amorphous carbon, and mixtures thereof. Examples of the crystalline carbon include natural graphite and artificial graphite, each of which may have an amorphous shape, a plate shape, a flake shape, a spherical shape, or a fiber shape. Examples of the amorphous carbon include soft carbon (low-temperature calcined carbon), hard carbon, mesocarbon, mesophase pitch carbon, and calcined coke.

FIG. 1 is a diagram of an embodiment of an all-solid-state lithium battery 30. Referring to FIG. 1, the all-solid-state lithium battery 30 includes a solid electrolyte layer 20, a positive electrode 22 disposed on a top surface of the solid electrolyte layer 20, and a negative electrode 24 disposed on a bottom surface of the solid electrolyte layer 20. The positive electrode 22 includes a positive active material layer 22b that contacts the solid electrolyte layer 20 and a positive current collector 22a that contacts the positive active material layer 22b. The negative electrode 24 includes a negative active material layer 24a that contacts the solid electrolyte layer 20 and a negative current collector 24b that contacts the negative active material layer 24a. The all-solid-state lithium battery 30 may be manufactured using at least one of a solid-state method, and a vapor-state method. For example, a positive electrode and a negative electrode may be formed respectively on opposite sides of the solid electrolyte layer 20 using at least one of a vapor-state method, and a solid-state method, and then current collectors are respectively formed on the positive and negative electrodes, thereby completing the manufacture of the all-solid-state lithium battery 30. Alternatively, the negative active material layer 24a, the solid electrolyte layer 20, the positive active material layer 22b, and the positive current collector 22a may be sequentially stacked on the negative current collector 24b using at least one of a vapor-state method, and a solid-state method thereby completing the manufacture of the all-solid-state lithium battery 30.

Lithium Battery Including Organic Electrolyte Solution

According to another embodiment, a lithium battery includes: a positive electrode including a positive active material; a negative electrode including a negative active material; and an organic electrolyte solution, wherein at least one of the positive electrode, the negative electrode, and the organic electrolyte solution includes the solid ion conductor described above.

Due to the inclusion of the solid ion conductor, the lithium battery may have an improved lifetime characteristic and improved thermal stability.

In the lithium battery, the positive electrode may include the solid ion conductor. The amount of the solid ion conductor in the positive electrode may be in a range of about 0 to about 50 wt %, specifically about 1 to about 40 wt %, more specifically about 2 to about 30 wt %, based on a total weight of the positive active material and the solid ion conductor. For example, the amount of the solid ion conductor in the positive electrode may be in a range of about 0 to about 30 wt %, based on the total weight of the positive active material and the solid ion conductor. For example, the amount of the solid ion conductor in the positive electrode may be in a range of about 0 to about 10 wt %, based on the total weight of the positive active material and the solid ion conductor. When the amount of the solid ion conductor in the positive electrode is too large, a capacity of the lithium battery may be reduced. In order to more easily adhere solid ion conductor particles onto surfaces of the positive active material particles in the positive electrode, a particle diameter, e.g., average particle diameter, of the solid ion conductor may be selected to be smaller than a particle diameter of the positive active material particles.

Also, the negative electrode of the lithium battery may include the solid ion conductor. The amount of the solid ion conductor in the negative electrode may be in a range of about 0 to about 50 wt %, specifically about 1 to about 40 wt %, more specifically about 2 to about 30 wt %, based on a total weight of the negative active material and the solid ion conductor. For example, the amount of the solid ion conductor in the negative electrode may be in a range of about 0 to about 30 wt %, based on the total weight of the negative active material and the solid ion conductor. For example, the amount of the solid ion conductor in the negative electrode may be in a range of about 0 to about 10 wt %, based on the total weight of the negative active material and the solid ion conductor. When the amount of the solid ion conductor in the negative electrode is too large, a capacity of the lithium battery may be reduced. In order to more easily adhere solid ion conductor particles onto surfaces of the negative active material particles in the negative electrode, a particle diameter, e.g., average particle diameter, of the solid ion conductor may be smaller than a particle diameter of the negative active material particles.

In addition, in the lithium battery, the organic electrolyte solution and/or a separator may include the solid ion conductor.

According to an embodiment, in the lithium battery, a coating layer including the solid ion conductor may be disposed on, e.g., formed on, a surface of at least one of the positive active material and the negative active material. The coating layer may prevent or suppress a side reaction between the positive active material and/or the negative active material and the organic electrolyte during charging and discharging of the lithium battery, deterioration of the positive and/or negative active materials due to elution of metal ions therefrom, and/or generation of an undesirable gas from the positive and/or negative active materials.

In another embodiment, a solid ion conductor film or membrane may be disposed on a surface of at least one of the positive electrode and the negative electrode which is proximate the organic electrolyte. For example, the solid ion conductor film may be disposed on, e.g., formed on, a surface of a positive active material layer and/or a negative active material layer which is proximate to the organic electrolyte solution. The solid ion conductor film may suppress a side reaction between the organic electrolyte solution and the positive active material layer and/or the negative active material layer and may also suppress the formation of a dendrite.

The lithium battery including the organic electrolyte solution may be manufactured as follows:

First, a positive electrode plate is prepared.

A positive active material, a conductive agent, a binder, and a solvent are mixed together to prepare a positive active material composition. The positive active material composition is directly coated on an Al current collector and dried, thereby completing the manufacture of the positive electrode plate. Alternatively, the positive active material composition may be cast on a separate support and peeled off from the support to obtain a film, and then the film laminated on the Al current collector, thereby completing the manufacture of the positive electrode plate. In another embodiment, the positive active material composition may be prepared in the form of an electrode ink including an excess amount of a solvent and printed on a support by inkjet printing or Gravure printing, thereby completing the manufacture of the positive electrode plate. The printing method is not limited to the above examples, and any suitable method that may be used in the coating and printing arts may be used.

The positive active material composition may further include the solid ion conductor. The amount of the solid ion conductor in the positive active material composition may be 50 wt % or less, based on the total weight of the positive active material and the solid ion conductor.

The positive active material used in the positive electrode may be the same as that used in the all-solid-state lithium battery disclosed above.

The conductive agent may be, for example, carbon black. Examples of the binder include at least one of a vinylidene fluoride/hexafluoropropylene copolymer, polyvinylidene fluoride, polyacrylnitrile, polymethylmethacrylate, polytetrafluoroethylene, polyimide, polyamideimide, a styrene-butadiene rubber-based polymer, acrylate-based rubber, and sodium carboxymethylcellulose. The solvent may be, for example, N-methylpyrrolidone, acetone, water, or the like.

Suitable amounts of the positive active material, the conductive agent, the binder, and the solvent are amounts that are used in a lithium battery. Suitable amounts can be determined by one of skill in the art without undue experimentation.

Next, a negative electrode is prepared.

Similarly, a negative active material, a conductive agent, a binder, and a solvent are mixed together to prepare a negative active material composition. The negative active material composition is directly coated on a Cu current collector and dried, thereby completing the manufacture of the negative electrode. Alternatively, the negative active material composition may be cast on a separate support and peeled off from the support to obtain a negative active material film, and then the negative active material film may be laminated on the Cu current collector, thereby completing the manufacture of the negative electrode. In another embodiment, the negative active material composition may be prepared in the form of an electrode ink including an excess amount of a solvent and printed on a support by inkjet printing or Gravure printing, thereby completing the manufacture of the negative electrode. The printing method is not limited to the above examples, and any suitable method that may be used in the coating and printing arts may be used.

In addition, a solid ion conductor coating layer may be further formed on a positive active material layer of the positive electrode. The solid ion conductor coating layer may be formed using any one of various methods known in the art, such as a vaporization method, a solid-state reaction method, or the like. For example, the solid ion conductor coating layer may be formed by coating and drying a slurry including the solid ion conductor.

The negative active material composition may further include the solid ion conductor. The amount of the solid ion conductor in the negative active material composition may be 50 wt % or less of the total weight of the negative active material and the solid ion conductor.

The negative active material used in the negative electrode may be the same as that used in the all-solid-state lithium battery described above.

The conductive agent, the binder, and the solvent may be the same as those used in the manufacture of the positive electrode. Suitable amounts of the negative active material, the conductive agent, the binder, and the solvent are amounts that are used in a lithium battery. Suitable amounts can be determined by one of skill in the art without undue experimentation.

A plasticizer may be added to the positive active material composition and the negative active material composition, and thus, pores may be formed in the positive and negative electrodes.

Next, a separator is prepared.

The positive electrode and the negative electrode may be separated by the separator, and any suitable separator that is used in a lithium battery may be used. In an embodiment, the separator has low resistance to migration of ions in an electrolyte and has a high electrolyte-retaining ability. Examples of the separator include at least one of glass fiber, polyester, Teflon®, polyethylene, polypropylene, and polytetrafluoroethylene ("PTFE"), each of which may be in the form of a non-woven or a woven fabric. In particular, a windable separator including polyethylene, polypropylene, or the like may be used in a lithium ion battery. A separator capable of retaining a large amount of an organic electrolyte solution may be used, as in a lithium-ion polymer battery.

The separator may be prepared as follows: A polymer resin, a filler, and a solvent are combined to prepare a separator composition. The separator composition is directly coated on an electrode and then dried to form a separator film. Alternatively, the separator composition may be cast on a separate support, dried, detached from a separator support, and finally laminated on an upper portion of the electrode, thereby forming a separator film.

The polymer resin is not particularly limited, and any suitable polymer resin that is used as an adhesive material of the positive and negative electrodes may be used. Examples of the polymer resin include at least one of a vinylidene-fluoride/hexafluoropropylene copolymer, polyvinylidene-fluoride, polyacrylonitrile, and polymethylmethacrylate. A vinylidenefluoride/hexafluoropropylene copolymer including about 8 to about 25 wt % of hexafluoropropylene may be suitably used.

Next, an electrolyte is prepared.

The electrolyte may be a liquid electrolyte including an organic electrolyte solution. The organic electrolyte solution may be prepared by dissolving a lithium salt in an organic solvent.

Any suitable organic solvent used in the art may be used. Examples of the organic solvent include at least one of propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxolane, 1,2-dimethoxyethane, sulfolane, dichloroethane, chlorobenzene, nitrobenzene, diethylene glycol, and dimethyl ether.

Any suitable lithium salt used in the art may be used. Examples of the lithium salt include at least one of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are different from each other and each independently are an integer of 1 to 20, LiCl, and LiI.

The amount of the lithium salt may be in a range of about 0.01 molar (M) to about 2.0 M, but is not limited thereto. The amount of the lithium salt may be appropriately selected within the range that provides an improved battery performance without undue experimentation.

The organic electrolyte solution may further include a flame retardant material such as a phosphorus-based flame retardant material or a halogen-based flame retardant material.

Figure 2:
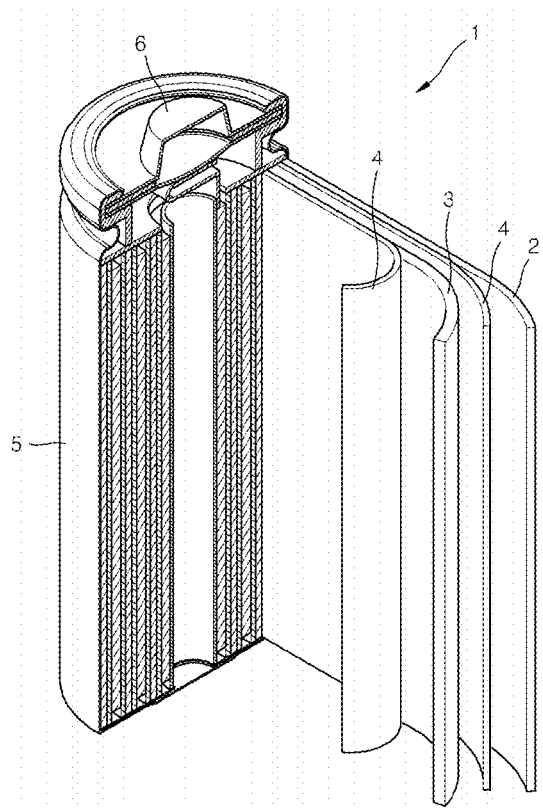
FIG. 2 is a diagram of an embodiment of a lithium battery including an organic electrolyte solution.

FIG. 2 is a diagram of a lithium battery 1 including an organic electrolyte solution, according to another embodiment. Referring to FIG. 2, the lithium battery 1 including an organic electrolyte solution includes a positive electrode 3, a negative electrode 2, and a separator 4. The positive electrode 3, the negative electrode 2, and the separator 4 are wound or folded and then disposed in a battery case 5. Subsequently, the organic electrolyte is injected into the battery case 5 and the battery case 5 is sealed by a cap assembly 6, thereby completing the manufacture of the lithium battery 1. The battery case 5 may be cylindrical, a rectilinear, curvilinear, or in the form of a thin film. For example, the lithium battery 1 may be a large thin-film-type battery. The lithium battery 1 may be a lithium ion battery.

A separator may be disposed between the positive electrode and the negative electrode to form a battery assembly. A plurality of battery assemblies may be stacked in a bi-cell structure and impregnated with an organic electrolyte solution, and the resulting structure may be accommodated in a pouch and sealed, thereby completing the manufacture of a lithium ion polymer battery. In addition, battery assemblies may be stacked on each other to form a battery pack, and the battery pack may be used to provide a high capacity and high-performance battery for a device, such as a notebook computer, a smart phone, an electric vehicle, and the like.

Since the lithium battery has high thermal stability and high-rate characteristics, the lithium battery is suitable for use in an electric vehicle ("EV"). For example, the lithium battery may be used in a hybrid vehicle such as a plug-in hybrid electric vehicle ("PHEV"). In addition, the lithium battery may be used in fields such as electricity storage systems that store a large amount of electricity, and the like.

Lithium Air Battery

According to another embodiment, a lithium air battery includes the solid ion conductor described above. Due to the inclusion of the solid ion conductor, the lithium air battery may have an improved stability and energy efficiency.

The lithium air battery includes a positive electrode, a negative electrode, and a separator, in which an ion conductive membrane including the solid ion conductor may be disposed on a surface of at least one of the positive electrode, the negative electrode, and the separator.

In an embodiment, the ion conductive membrane including the solid ion conductor may be formed on a surface of the negative electrode facing the positive electrode, and thus, a side reaction between the negative electrode and an electrolyte may be suppressed, resulting in an improved lifetime of the lithium air battery.

In addition, the ion conductive membrane may be formed on at least a surface of the separator of the lithium air battery. Also, the ion conductive membrane may be formed on a surface of the positive electrode facing the negative electrode.

The lithium air battery including the ion conductive membrane may be prepared as follows:

First, a positive electrode, a negative electrode capable of intercalating and deintercalating lithium, and a separator are prepared. An ion conductive membrane including the solid ion conductor may be disposed on a surface of at least one of the positive electrode, the negative electrode, and the separator.

Next, the negative electrode is disposed on, e.g., mounted on, one side of a case, and the positive electrode with the separator is mounted on the other side of the case, opposite to the negative electrode. The separator is disposed on the side of the positive electrode, facing the negative electrode. Subsequently, an electrolyte is disposed, e.g., injected, between the positive electrode and the negative electrode, a porous current collector is disposed on the positive electrode, and a pressing member that allows air to reach the positive electrode and applies pressure disposed to contain the cell, thereby completing the manufacture of the lithium air battery. A lithium ion conductive solid electrolyte membrane may be further disposed on a surface of the negative electrode.

The case may be divided into upper and lower parts that contact the negative and positive electrodes, respectively. An insulating resin may be disposed between the upper and lower parts to electrically insulate the positive and negative electrodes from each other.

The positive electrode may be manufactured as follows: A catalyst for oxidation/reduction of oxygen, a conductive material, and a binder are combined and an appropriate solvent is added thereto to prepare a positive electrode slurry. The positive electrode slurry is coated on a surface of a current collector and the coated current collector is then dried, optionally followed by press-molding to improve electrode density, thereby completing the manufacture of the positive electrode.

The conductive material may be porous. Thus, any suitable positive electrode material with porosity and conductivity may be used without limitation. For example, porous carbon-based materials may be used. Examples of a carbon-based material include carbon black, graphite, graphene, activated carbon, carbon fibers, and combinations thereof. Metallic conductive materials, including metal fibers and metal meshes, may be used. Metal powders including copper, silver, nickel, aluminum, and the like may be used. Organic conductive materials, such as polyphenylene derivatives, may be used. The above-described conductive materials may be used alone or in combination.

Examples of the catalyst for oxidation/reduction of oxygen include precious metal-based catalysts such as platinum, gold, silver, palladium, ruthenium, rhodium, and osmium; oxide-based catalysts such as a manganese oxide, an iron oxide, a cobalt oxide, and a nickel oxide; and organometallic catalysts such as cobalt phthalocyanine. However, the catalyst is not limited to the above examples and any suitable catalyst for oxidation/reduction of oxygen which are known in the art may be used. The catalyst for oxidation/reduction of oxygen may be omitted if desired.

The catalyst may be supported on a catalyst support. The catalyst support may be an oxide, zeolite, clay-based minerals, or carbon. The oxide may be at least one oxide of alumina, silica, zirconium oxide, and titanium dioxide, or may be an oxide including at least one metal of cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Examples of the carbon include amorphous carbons such as carbon black, acetylene black, channel black, and lamp black; graphite such as natural graphite, artificial graphite, and expandable graphite; activated carbon; mesophase carbon, and carbon fibers. However, the catalyst support is not limited to the above examples and any suitable catalyst support known in the art may be used.

The binder may include a thermoplastic resin or a thermoset resin. Examples of the binder include, but are not limited to, polyethylene, polypropylene, polytetrafluoroethylene ("PTFE"), polyvinylidene fluoride ("PVDF"), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer. The binder materials listed may be used alone or in combination. However, any suitable binder available in the art may be used. The binder may be omitted, if desired.

A porous body in a matrix or mesh form may be used as the current collector to facilitate diffusion of oxygen. A porous metal plate comprising, for example, stainless steel, nickel, or aluminum may be used. Materials for the current collector are not particularly limited, and any suitable material for current collectors known in the art may be used. The current collector may be coated with an anti-oxidative metal or alloy to prevent oxidation.

In the lithium air battery, a material for the negative electrode which is capable of intercalating and deintercalating lithium may be Li metal, an Li metal-based alloy, or a material capable of intercalating and deintercalating lithium, but is not limited thereto. However, for a negative electrode, any suitable material may be used, such as lithium or a material which is capable of intercalating and deintercalating lithium. The negative electrode may determine the capacity of the lithium air battery and thus the negative electrode may be, for example, lithium metal. For example, the lithium metal-based alloy may be an alloy of lithium with aluminum, tin, magnesium, indium, calcium, titanium, or vanadium. The type of the negative electrode is not particularly limited. For example, the negative electrode may be in the form of a sheet.

The separator disposed between the positive electrode and the negative electrode is not particularly limited as long as it has a composition that can withstand service conditions of the lithium air battery. Examples of the separator include polymer nonwoven fabrics such as polypropylene nonwoven fabrics and polyphenylene sulfide nonwoven fabrics; and porous films composed of olefin resins such as polyethylene and polypropylene. These materials may also be used in combination. The separator may be omitted if desired.

The electrolyte may be an organic electrolyte or an aqueous electrolyte.

The organic electrolyte may include an aprotic solvent. The aprotic solvent may be a carbonate-based solvent, an ester-based solvent, an ether-based solvent, a ketone-based solvent, an amine-based solvent, or a phosphine-based solvent. Examples of the carbonate-based solvent include dimethyl carbonate ("DMC"), diethyl carbonate ("DEC"), ethyl methyl carbonate ("EMC"), dipropyl carbonate ("DPC"), methyl propyl carbonate ("MPC"), ethyl propyl carbonate ("EPC"), methyl ethyl carbonate ("MEC"), ethylene carbonate ("EC"), propylene carbonate ("PC"), and butylene carbonate ("BC"). Examples of the ester-based solvent include methyl acetate, ethyl acetate, n-propyl acetate, dimethylacetate, methyl propionate, ethyl propionate, γ-butyrolactone, decanolide, valerolactone, mevalonolactone, and caprolactone. Examples of the ether-based solvent include dibutyl ether, tetraglyme, diglyme, dimethoxyethane, 2-methyltetrahydrofuran, and tetrahydrofuran. For example, the ketone-based solvent may be cyclohexanone. Examples of the amine-based solvent include triethylamine and triphenylamine. For example, the phosphine-based solvent may be triethylphosphine. However, the aprotic solvent is not limited to the above examples, and any aprotic solvent known in the art may be used.

Examples of the aprotic solvent include: a nitrile such as a nitrile of the formula R—CN where R is a linear, branched, or cyclic $C_2$ to $C_{20}$ hydrocarbon group and has a double-bond, an aromatic ring, or an ether bond; an amide such as dimethylformamide; a dioxolane such as 1,3-dioxolane; and a sulfolane.

The aprotic solvent may be used alone or in combination. When the organic solvents are used in combination, a ratio thereof may be appropriately selected according to the desired performance of the battery to be manufactured and may be determined by one of skill in the art without undue experimentation.

The organic electrolyte may include an ionic liquid. Examples of the ionic liquid include linear or branched, substituted compounds containing cations such as ammonium, imidazolium, pyrrolidinium, and piperidinium, and anions such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, and $(CN)_2N^-$.

The organic electrolyte may include at least one of an alkali metal salt and an alkali earth metal salt. The at least one of the alkali metal salt and the alkali earth metal salt may be dissolved in an organic solvent and may be as a source of at least one of the alkali metal ions and the alkali earth metal ions in the lithium air battery. The salt may facilitate migration of the alkali metal ions and/or alkali earth metal ions between the positive and negative electrodes.

For example, a cation of the alkali metal salt and/or the alkali earth metal salt may include a lithium ion, a sodium ion, a magnesium ion, a potassium ion, a calcium ion, a rubidium ion, a strontium ion, a cesium ion, a barium ion, and the like.

Anions of the alkali metal salt and/or alkali earth metal salt in the organic electrolyte may be at least one anion of $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ where x is a natural number, $(C_xF_{2x+1}SO_2)(C_yF_{2y+1}SO_2)N^-$ where x and y are natural numbers, and a halogen.

For example, the alkali metal salt and/or alkali earth metal salt may be, but are/is not limited to, at least one compound selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiF, LiBr, LiCl, LiI, and $LiB(C_2O_4)_2$ (LiBOB; lithium bis(oxalato)borate). Any suitable alkali metal salts and/or alkali earth metal salts available in the art may be used.

In the organic electrolyte, the amount of the at least one of the alkali metal salt and the alkali earth metal salt may be from about 100 millimolar (mM) to about 10 M, for example, from about 500 mM to about 2 M. The amount of the at least one of the alkali metal salt and the alkali earth metal salt is not particularly limited, as long as the organic electrolyte may effectively transfer lithium ions and/or electrons during charging and discharging.

In addition, a lithium ion conductive solid electrolyte membrane may be disposed between the negative electrode and the electrolyte. The lithium ion conductive solid electrolyte membrane may serve as a protective layer to substantially or effectively prevent water contained in an aqueous electrolyte and impurities, such as oxygen, from directly reacting with lithium contained in the negative electrode.

A material for the lithium ion conductive solid electrolyte membrane may be an inorganic material, for example, a lithium ion conductive glass, lithium ion conductive crystal (ceramic or glass-ceramic), or a combination thereof. However, the electrolyte membrane material is not limited to the above examples and any suitable material known in the art for a solid electrolyte membrane which has lithium ion conductivity and can protect the negative electrode may be used. For chemical stability concerns, the material for the lithium ion conductive solid electrolyte membrane may be an oxide.

The lithium ion conductive solid electrolyte membrane may include a solid ion conductor including the garnet-type oxide of Formulas 2, 3, or 4 described above.

The lithium ion conductive solid electrolyte membrane may further include a lithium ion conductive crystal. For example, the lithium ion conductive crystal may be $Li_{1+x+y}(Al, Ga)_x(Ti, Ge)_{2-x}Si_yP_{3-y}O_{12}$ where $0 \le x \le 1$ and $0 \le y \le 1$, for example, $0 \le x \le 0.4$ and $0 \le y \le 0.6$, for example, $0.1 \le x \le 0.3$, and $0.1 \le y \le 0.4$. Examples of the lithium ion conductive crystal include a glass-ceramic such as lithium-aluminum-germanium-phosphate ("LAGP"), lithium-aluminum-titanium-phosphate ("LATP"), lithium-aluminum-titanium-silicon-phosphate ("LATSP"), and the like.

In an embodiment, the lithium ion conductive solid electrolyte membrane may further include a polymer solid electrolyte, in addition to the glass-ceramic. The polymer solid electrolyte may be polyethylene oxide comprising, e.g., doped with, a lithium salt. Examples of the lithium salt include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, and the like. For example, in addition to the polyethylene oxide, the polymer solid electrolyte may be polymethylmetaacrylate ("PMMA"), Polypropylene oxide ("PPO"), polyvinylidene fluoride ("PVdF"), Polystyrene ("PS"), polyvinyl chloride ("PVC"), polyvinyl alcohol ("PVA"), polyacrylonitrile ("PAN"), polyester sulfide ("PES"), derivatives thereof, other polymers comprising ion dissociable groups and the like.

The lithium ion conductive solid electrolyte membrane may further include an inorganic solid electrolyte, in addition to the glass-ceramic. Examples of the inorganic solid electrolyte include $Cu_3N$, $Li_3N$, LiPON, and the like.

The lithium air battery may be either a lithium primary battery or a lithium secondary battery. The lithium air battery may have various shapes, and in some embodiments, may have a coin, button, sheet, stack, cylinder, plane, or horn shape. The lithium battery may be cylindrical, rectilinear, or curvilinear. The lithium air battery may be used as a large-scale battery for electric vehicles.

Figure 3:
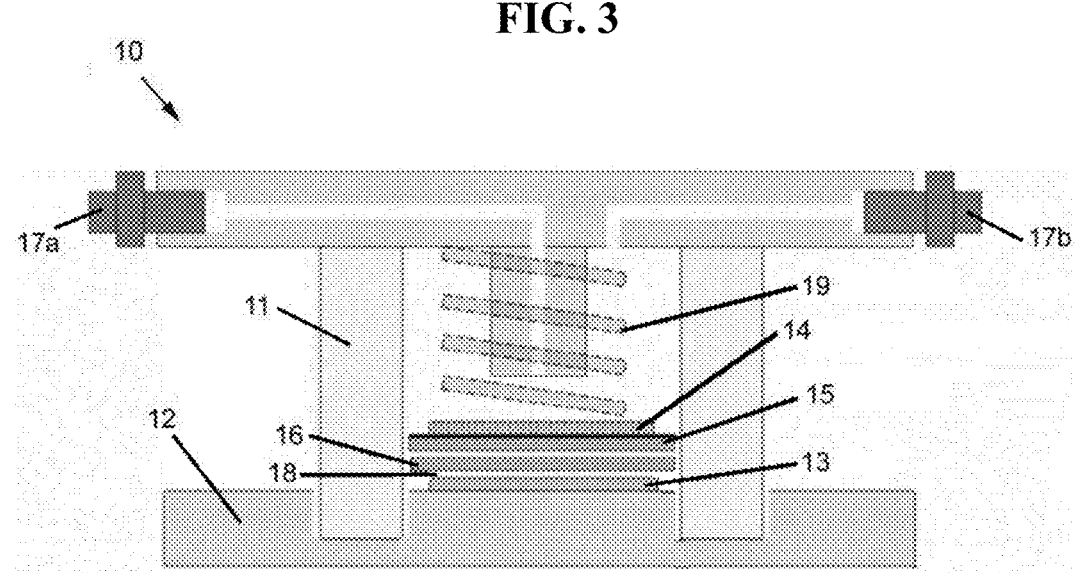
FIG. 3 is a diagram of an embodiment of a lithium air battery.

FIG. 3 is a diagram illustrating a lithium air battery 10 according to another embodiment. The lithium air battery 10 includes a positive electrode 15 using oxygen as an active material and disposed on a first current collector 14, a negative electrode 13 including lithium and contacting a second current collector 12, an organic electrolyte 18 disposed between the positive electrode 15 and the negative electrode 13, and a separator 16 disposed on one surface of the positive electrode 15. A lithium ion conductive solid electrolyte membrane (not shown) may be disposed on one surface of the negative electrode 13. The first current collector 14, which is porous, may serve as a gas diffusion layer. Also, a pressing member 19 that allows air to reach the positive electrode 15 may be disposed on the first current collector 14. A case 11 formed of an insulating resin is disposed between the positive electrode 15 and the negative electrode 13 to electrically insulate the positive electrode 15 and the negative electrode 13. Air is supplied to an air inlet 17a and exhausted via an air outlet 17b.

As used herein, the term "air" is not limited to atmospheric air, and may refer to a combination of gases including oxygen, or pure oxygen gas. This broad definition of "air" also applies to other terms including "air battery" and "air electrode."

According to another embodiment, a method of preparing a solid ion conductor includes: providing a precursor of a solid ion conductor; and sintering the precursor in an air atmosphere at a temperature of about 800° C. to about 1250° C. for about 2 to about 40 hours to prepare the solid ion conductor, wherein the solid ion conductor comprises a garnet oxide represented by Formula 1:

$$L_{5+x}E_3(Me_zM_{2-z})O_d \qquad \text{Formula 1}$$

wherein L is at least one of a monovalent cation and a divalent cation and provided at least a part or all of L is Li; E is a trivalent cation; Me and M are each independently one of a trivalent, tetravalent, pentavalent, and a hexavalent cation; $0 < x \le 3$, $0 \le z < 2$, and $0 < d \le 12$; and O is partially or totally substituted with at least one of a pentavalent anion, a hexavalent anion, and a heptavalent anion.

In an embodiment, a method of preparing a solid ion conductor may comprise contacting a lithium compound, a compound comprising a Group 1 element other than Li, a compound comprising a trivalent cation, and a compound comprising a metal element of Group 1 to Group 14 to form a mixture; and sintering the mixture to preparing the solid ion conductor, wherein the solid ion conductor has a cubic or pseudocubic structure.

For example, the sintering process may be performed at a temperature of about 900° C. to about 1200° C. for about 5 to about 30 hours. The precursor of the solid ion conductor may comprise precursors of metals contained in the solid ion conductor, and any suitable precursor of a solid ion conductor available in the art may be used.

When the sintering temperature is too low, sintering reactivity may be insufficient. On the other hand, when the sintering temperature is too high, phase decomposition may occur or lithium may volatilize. In addition, when the sintering time is too short, sintering reactivity may be insufficient. On the other hand, when the sintering time is too long, lithium may volatilize.

In the preparation method, the providing of the precursors of the solid ion conductor may comprise combining or mixing, which may be performed using a ball mill.

The method may further include preliminarily sintering the mixture of the precursor of a solid ion conductor at a relatively low temperature, before the sintering process. The preliminary sintering process may be performed twice or more times.

The solid ion conductor prepared using the preparation method may have various forms, such as powder, a thin film, a pellet, and the like, and may be appropriately selected according to the use thereof.

One or more embodiments will now be described more fully with reference to the following examples. However, these examples are provided only for illustrative purposes and are not intended to limit the scope of the present disclosure.

Preparation of Solid Ion Conductor

Example 1: Preparation of $Li_{7.125}Rb_{0.0625}La_{2.9375}Zr_2O_{12}$

LiOH as an Li precursor, $Rb_2CO_3$ as an Rb precursor, $La_2O_3$ as an La precursor, and $ZrO_2$ as a Zr precursor, which were used as starting materials, were stoichiometrically mixed together to obtain $Li_{5+x+2y}(D_y,La_{3-y})Zr_2O_{12}$ where D=Rb, x=2 and y=0.0625.

The mixture was pulverized by mixing in isopropyl alcohol as a solvent using a planetary ball mill (400 revolutions per minute ("RPM"), zirconia oxide balls) for 6 hours. The pulverized mixed powder was put in an alumina crucible and sintered in an air atmosphere at 900° C. for 12 hours.

To supplement a loss amount of Li, an excess amount of LiOH corresponding to 10 wt % of the amount of the Li, based on the amount of Li in the composition of a final product, was used.

The mixture with LiOH added thereto was pulverized by mixing in isopropyl alcohol using a planetary ball mill (500 RPM, zirconia oxide balls) for 6 hours. The sintered powder was molded in the form of a pellet or a thin film or was not molded, and sintered in an air atmosphere at 1100° C. for 20 hours, thereby completing the preparation of a solid ion conductor.

Example 2: Preparation of $Li_{7.25}Rb_{0.125}La_{2.875}Zr_2O_{12}$

A solid ion conductor was prepared in the same manner as in Example 1, except that a stoichiometric ratio of the starting materials was changed to obtain $Li_{5+x+2y}(D_y,La_{3-y})Zr_2O_{12}$ where D=Rb, x=2, and y=0.125.

Example 3: Preparation of $Li_{7.5}Rb_{0.25}La_{2.75}Zr_2O_{12}$

A solid ion conductor was prepared in the same manner as in Example 1, except that a stoichiometric ratio of the starting materials was changed to obtain $Li_{5+x+2y}(D_y,La_{3-y})Zr_2O_{12}$ where D=Rb, x=2, and y=0.25.

Example 4: Preparation of $Li_8Rb_{0.5}La_{2.5}Zr_2O_{12}$

A solid ion conductor was prepared in the same manner as in Example 1, except that a stoichiometric ratio of the starting materials was changed to obtain $Li_{5+x+2y}(D_y,La_{3-y})Zr_2O_{12}$ where D=Rb, x=2, and y=0.5.

Example 5: Preparation of $Li_{7.125}Cs_{0.0625}La_{2.9375}Zr_2O_{12}$

A solid ion conductor was prepared in the same manner as in Example 1, except that a stoichiometric ratio of the starting materials was changed to obtain $Li_{5+x+2y}(D_y,La_{3-y})Zr_2O_{12}$ where D=Cs, x=2, and y=0.0625, and $Cs_2CO_3$ as a Cs precursor was used instead of the Rb precursor.

Example 6: Preparation of $Li_{7.125}K_{0.0625}La_{2.9375}Zr_2O_{12}$

A solid ion conductor was prepared in the same manner as in Example 1, except that a stoichiometric ratio of the starting materials was changed to obtain $Li_{5+x+2y}(D_y,La_{3-y})Zr_2O_{12}$ where D=K, x=2, and y=0.0625, and $K_2CO_3$ as a K precursor was used instead of the Rb precursor.

Comparative Example 1: Preparation of $Li_7La_3Zr_2O_{12}$

A solid ion conductor was prepared in the same manner as in Example 1, except that a stoichiometric ratio of the starting materials was changed to obtain $Li_7La_3Zr_2O_{12}$.

Comparative Example 2: Preparation of $Li_9RbLa_2Zr_2O_{12}$

A solid ion conductor was prepared in the same manner as in Example 1, except that a stoichiometric ratio of the starting materials was changed to obtain $Li_9RbLa_2Zr_2O_{12}$.

Evaluation Example 1: X-Ray Diffraction Analysis

X-ray diffraction analysis was performed on the sintered powders prepared according to Examples 1 to 6. The obtained XRD spectra were Rietveld-fitted. From the results, it was confirmed that the solid ion conductors of Examples 1 to 6 basically had a garnet-type crystal structure.

Evaluation Example 2: Ionic Conductivity Measurement

Pt was deposited on both surfaces of each of the pellet-type solid ion conductors of Examples 1 to 6 using sputtering to form a shield electrode. An impedance of each pellet with the shield electrode formed thereon was measured by a 2-probe method by using a Solatron SI1260 impedance/gain-phase analyzer. A frequency range was from 0.1 Hertz (Hz) to 1 MegaHertz (MHz), and an amplitude voltage was 20 milliVolts (mV). The impedance was measured in an air atmosphere at 25° C. Resistance values were obtained from an arc of a Nyquist plot for the impedance measurement results and ionic conductivity of each sample was calculated therefrom. The results are shown in Table 1 and FIG. 4.

TABLE 1

| | Ionic conductivity [S/cm] |
|---|---|
| Example 1 | $8.3 \times 10^{-4}$ |
| Example 2 | $6.3 \times 10^{-4}$ |
| Example 3 | $5.7 \times 10^{-4}$ |
| Example 4 | $2.1 \times 10^{-5}$ |
| Example 5 | $4.1 \times 10^{-4}$ |

TABLE 1-continued

| | Ionic conductivity [S/cm] |
|---|---|
| Example 6 | $5.3 \times 10^{-4}$ |
| Comparative Example 1 | $2.0 \times 10^{-4}$ |
| Comparative Example 2 | $4.5 \times 10^{-6}$ |

Figure 4:
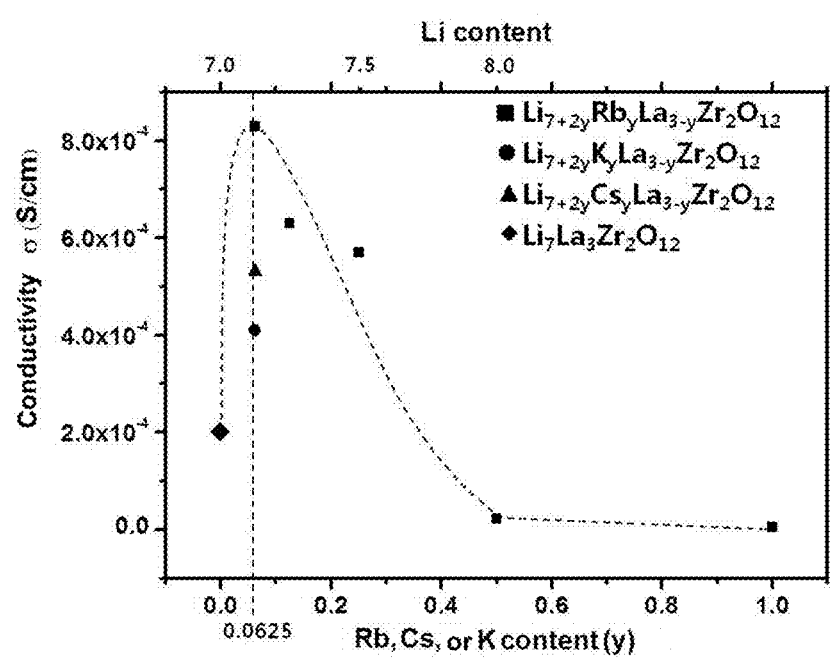
FIG. 4 is a graph of conductivity ($\sigma$, Siemens per centimeter, S/cm) versus Li content and Rb, Cs, or K content (y in $Li_{7+2y}(Rb, Cs, or K)_yLa_{3-y}Zr_2O_{12}$) showing conductivities of solid ion conductors prepared according to Examples 1 through 6 and Comparative Examples 1 and 2.

As shown in Table 1 and FIG. 4, most of the solid ion conductors of Examples 1 to 6 exhibited a higher ionic conductivity than that of the solid ion conductors of Comparative Examples 1 and 2.

Evaluation Example 3: Activation Energy Measurement

Figure 5:
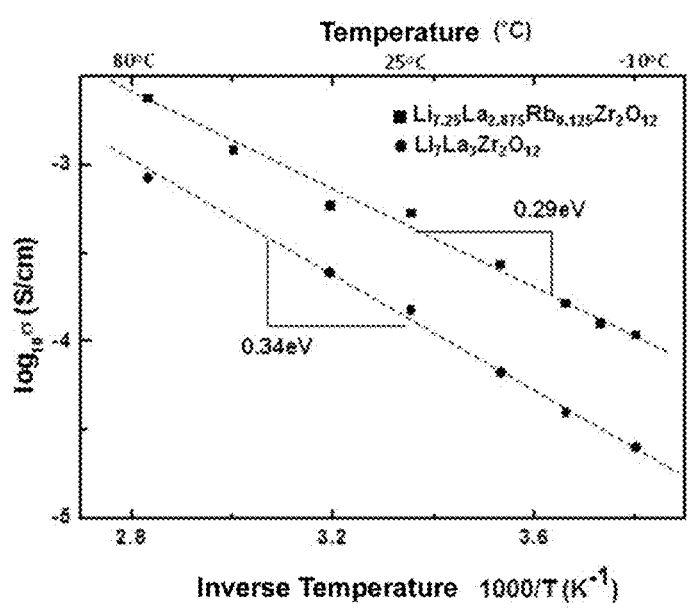
FIG. 5 is a graph of log conductivity (log a, Siemens per centimeter, S/cm) versus inverse temperature (1000/T, Kelvin$^{-1}$) showing activation energies of the solid ion conductors of Example 2 and Comparative Example 1.

Activation energy is calculated from a slope of an Arrhenius plot using an Arrhenius equation 1 below, and the measurement results of the solid ion conductors of Example 2 (x=2, y=0.125) and Comparative Example 1 (x=2, y=0) are shown in FIG. 5. The Arrhenius plot illustrates conductivity according to temperature of the solid ion conductors of Example 2 and Comparative Example 1:

$$\sigma = Ae^{(-Ea/kT)} \quad \text{Formula 1}$$

wherein σ is conductivity, A is a frequency factor, Ea is activation energy, k is the Boltzman constant, and T is absolute temperature.

As shown in FIG. 5, the activation energy of the solid ion conductor of Example 2 was decreased to 2.9 eV, i.e., by 0.5 eV, as compared to 3.4 eV of the solid ion conductor of Comparative Example 1.

Evaluation Example 4: Potential Window Measurement

Figure 6:
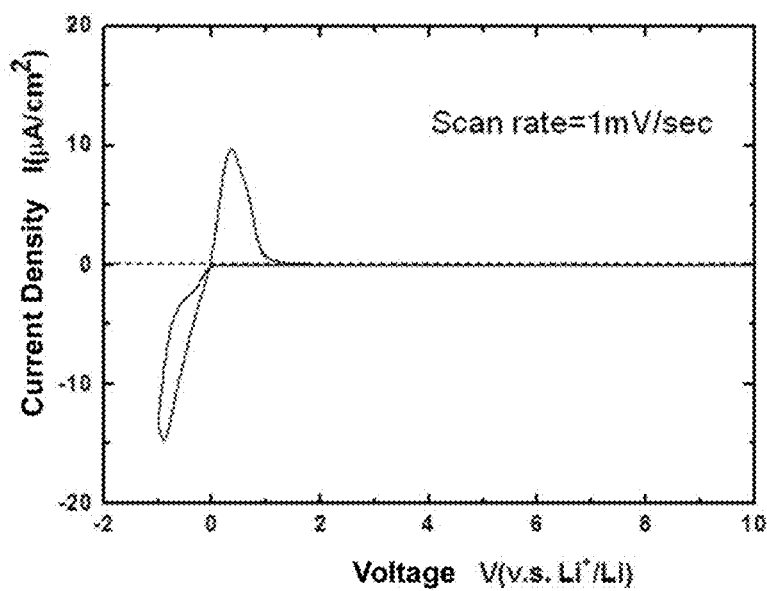
FIG. 6 is a graph of current density (microamperes per square centimeter, $\mu A/cm^2$) versus voltage (Volts versus $Li^+/Li$) showing measurement results of current versus voltage of the solid ion conductor of Example 2.

In the solid ion conductor of Example 2 (x=2, y=0.125), Pt was deposited on a surface of the pellet and Li metal was applied on the other surface thereof. A current was measured while being scanning the pellet at a voltage of −0.5 V to 10 V with respect to Li metal at a scanning rate of 1 mV/sec. The measurement results are shown in FIG. 6.

The increase of the scanning voltage from −0.5 V to 10 V caused an oxidation-reduction current at greater than 0 V and less than 0 V. It is thought that this is related to oxidation or reduction of Li. No other peak than the Li oxidation/reduction peak was observed, which confirms that the pellet used in Example 2 is stable with respect to Li metal.

As described above, according to the one or more of the above embodiments, a solid ion conductor has improved conductivity. While not wanting to be bound by theory, it is believed that the solid ion conductor has a structure in which at least a portion of trivalent cations present at a dodecahedral site are substituted with a monovalent cation, and thus, the solid ion conductor has an improved ionic conductivity. In addition, various types of lithium batteries including the solid ion conductors are provided.

It should be understood that the exemplary embodiments described therein should be considered in a descriptive sense only and not for purposes of limitation. Descriptions of features, advantages, or aspects within each embodiment shall be considered as available for other similar features, advantages, or aspects in other embodiments.

What is claimed is:
1. A solid ion conductor comprising:
a garnet oxide represented by Formula 4:

$$Li_{5+x+2y}(D_y La_{3-y})Zr_2O_{12} \quad \text{Formula 4}$$

wherein D is K, Rb, or Cs, and
0<x+2y≤3 and 0<y≤0.5.
2. The solid ion conductor of claim 1, further comprising a Group 1 element having an atomic weight of at least 80 Daltons.
3. The solid ion conductor of claim 2, wherein an amount of the Group 1 element is in a range of about 0.25 to about 3.85 weight percent, based on a total weight of the solid ion conductor.
4. The solid ion conductor of claim 1, wherein the Group 1 element is present at a grain boundary of the garnet oxide of Formula 1.
5. The solid ion conductor of claim 1, wherein x and y satisfy the inequality 2<x+2y≤3.
6. The solid ion conductor of claim 3, wherein the garnet oxide has an ionic conductivity of about $6.0 \times 10^{-4}$ Siemens per centimeter or more at 25° C.
7. The solid ion conductor of claim 6, wherein the garnet oxide has an activation energy that is less than about 0.34 electron volts at a temperature from −10° C. to 100° C.
8. A solid electrolyte comprising the solid ion conductor according to claim 1.
9. An all-solid-state lithium battery comprising the solid electrolyte according to claim 8.
10. A lithium battery comprising:
a positive electrode comprising a positive active material;
a negative electrode comprising a negative active material; and
an organic electrolyte solution,
wherein at least one of the positive electrode, the negative electrode, and the organic electrolyte solution comprises the solid ion conductor according to claim 1.
11. The lithium battery of claim 10, wherein the solid ion conductor is present in the form of a coating layer disposed on a surface of at least one of the positive active material and the negative active material.
12. The lithium battery of claim 10, wherein the solid ion conductor is present in the form of a solid ion conductor membrane which is disposed on a surface of at least one of the positive electrode and the negative electrode, wherein the surface is proximate to the organic electrolyte solution.
13. A lithium air battery comprising the solid ion conductor according to claim 1.
14. The lithium air battery of claim 13, wherein the battery comprises a positive electrode, a negative electrode, and a separator, and wherein an ion conductive membrane comprising the solid ion conductor is disposed on a surface of at least one of the positive electrode, the negative electrode, and the separator.
15. A method of preparing a solid ion conductor, the method comprising:
providing a precursor; and
sintering the precursor in an air atmosphere at a temperature from about 800° C. to about 1250° C. for about 2 to about 40 hours to prepare the solid ion conductor, wherein the solid ion conductor comprises a garnet oxide represented by Formula 4,
wherein the precursor is a precursor of the solid ion conductor:

$$Li_{5+x+2y}(D_y La_{3-y})Zr_2O_{12}$$

wherein

D is K, Rb, or Cs, and $0 < x+2y \leq 3$ and $0 < y \leq 0.5$.

16. The method of claim 15, wherein the sintering is performed at a temperature from about 900° C. to about 1200° C. for about 5 to about 30 hours.

17. A method of preparing a solid ion conductor, the method comprising:

contacting
- a lithium compound,
- a compound comprising a Group 1 element other than Li,
- a compound comprising a trivalent cation, and
- a compound comprising a metal element of Group 1 to Group 14 to form a mixture; and sintering the mixture to preparing the solid ion conductor,
- wherein the solid ion conductor has a cubic or pseudo-cubic structure, and
- wherein the solid ion conductor comprises a garnet oxide represented by Formula 4:

$$Li_{5+x+2y}(D_y,La_{3-y})Zr_2O_{12} \qquad \text{Formula 4}$$

wherein

D is K, Rb, or Cs, and $0 < x+2y \leq 3$ and $0 < y \leq 0.5$.

18. The method of claim 17, wherein the compound comprising a trivalent cation is lanthanum oxide.

19. The method of claim 18, wherein the compound comprising a metal element of Group 1 to Group 14 is a zirconium compound.

* * * * *